United States Patent
Yamada (10) Patent No.: US 7,274,489 B2
(45) Date of Patent: Sep. 25, 2007

(54) IMAGE FORMING APPARATUS AND METHOD OF CONTROLLING THE APPARATUS

(75) Inventor: Junji Yamada, Yokohama (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 1127 days.

(21) Appl. No.: 10/285,568

(22) Filed: Nov. 1, 2002

(65) Prior Publication Data
US 2004/0085554 A1    May 6, 2004

(51) Int. Cl.
G06F 15/00 (2006.01)
G06F 7/00 (2006.01)
G03F 3/00 (2006.01)
H04N 1/56 (2006.01)

(52) U.S. Cl. ............... 358/1.9; 358/461; 358/518; 358/519; 358/523; 358/1.16; 358/1.17; 358/529; 358/530; 358/1.1; 358/443; 358/448; 382/274; 382/167; 345/603; 345/604; 711/5

(58) Field of Classification Search ........... 358/461, 358/518, 519, 1.9, 523, 1.16, 529, 530, 1.1, 358/3.23, 443, 448
See application file for complete search history.

(56) References Cited

U.S. PATENT DOCUMENTS

| | | | | |
|---|---|---|---|---|
| 4,887,150 A * | 12/1989 | Chiba et al. | ............... | 358/523 |
| 5,084,762 A * | 1/1992 | Miyakawa | ............... | 358/529 |
| 5,132,788 A * | 7/1992 | Hirota | ............... | 358/517 |
| 5,184,146 A * | 2/1993 | Tanaka et al. | ............... | 347/232 |
| 5,576,847 A * | 11/1996 | Sekine et al. | ............... | 358/448 |
| 5,629,781 A * | 5/1997 | Ueno et al. | ............... | 358/523 |
| 6,049,394 A * | 4/2000 | Fukushima | ............... | 358/1.9 |
| 6,118,558 A * | 9/2000 | Ohashi et al. | ............... | 358/518 |
| 6,222,639 B1 * | 4/2001 | Suzuki | ............... | 358/1.9 |
| 2003/0035151 A1 * | 2/2003 | Kurita et al. | ............... | 358/448 |
| 2003/0128381 A1 * | 7/2003 | Zaima | ............... | 358/1.9 |
| 2004/0190091 A1 * | 9/2004 | Sato | ............... | 358/518 |

FOREIGN PATENT DOCUMENTS

| | | |
|---|---|---|
| JP | 2000-293432 | 10/2000 |
| JP | 2001-78022 | 3/2001 |

* cited by examiner

*Primary Examiner*—Kimberly Williams
*Assistant Examiner*—Beniyam Menberu
(74) *Attorney, Agent, or Firm*—Foley & Lardner LLP (57) ABSTRACT

One processing section 131 executes a process of generating image data K representing a black image on the basis of the image data Y, M, and C, and sequentially executes a process of removing elements of the black image contained in the image data Y, from the image data Y, a process of removing the elements of the black image contained in the image data M, from the image data M, and a process of removing the elements of the black image contained in the image data C, from the image data C.

9 Claims, 6 Drawing Sheets

IMAGE FORMING APPARATUS AND METHOD OF CONTROLLING THE APPARATUS

BACKGROUND OF THE INVENTION

In image forming apparatuses such as copiers, when a print key is turned on, a document set on a copy board is irradiated with light. A reflected light image from this document is projected on a photoelectric converter, e.g. a CCD (Charge Coupled Device), where it is converted into an electric signal.

The CCD has a light receiving surface on which a large number of light receiving elements (photoelectric converting elements) are arranged. The CCD scans each light receiving element to output an image signal (analog signal) with a voltage level corresponding to the density of the image projected on the light receiving surface.

In image forming apparatuses that can print color images, a red filter allowing red light to pass through, a green filter allowing green light to pass through, and a blue filter allowing blue light to pass through are arranged on the light receiving surface of the CCD. Accordingly, the CCD outputs an image signal corresponding to an image of red light, an image signal corresponding to an image of green light, and an image signal corresponding to an image of blue light.

The image signal corresponding to the image of red light is converted by an A/D (Analog-to-Digital) converter into a digital signal, which becomes image data R. The image signal corresponding to the image of green light is converted by the A/D converter into a digital signal, which becomes image data G. The image signal corresponding to the image of blue light is converted by the A/D converter into a digital signal, which becomes image data B.

On the other hand, image colors handled by the printer section include yellow, magenta, cyan, and black. Thus, the image data R, G, and B are converted into image data Y representing a yellow image, image data M representing a magenta image, and image data C representing a cyan image. Then, image data K representing a black image is generated on the basis of these image data Y, M, and C.

However, the image data Y, M, and C still contain elements of the above black image. To properly print the yellow image, the magenta image, and the cyan image, the elements of the black image contained in the image data Y, M, and C must be removed from the image data Y, M, and C.

Thus, it is necessary to have a processing section that removes the elements of the black image from the image data Y, a processing section that removes the elements of the black image from the image data M, and a processing section that removes the elements of the black image from the image data C.

However, the presence of the three processing sections disadvantageously complicates the configuration of the apparatus and increases its size and cost.

BRIEF SUMMARY OF THE INVENTION

It is an object of the present invention to provide an image forming apparatus and method of the apparatus which allows one processing section to execute a process of removing elements of a black image from image data Y, M, and C, thus simplifying the configuration of the apparatus and reducing the size and costs of the apparatus.

An image forming apparatus of the present invention comprises:

a photoelectric converter which outputs an image signal corresponding to an image of red light, an image signal corresponding to an image of green light, and an image signal corresponding to an image of blue light;

a converting section which converts the image signals output by the photoelectric converter into image data Y representing a yellow image, image data M representing a magenta image, and image data C representing a cyan image, respectively;

one processing section which executes a process of generating image data K representing a black image on the basis of the image data Y, M, and C and which sequentially executes a process of removing elements of the black image contained in the image data Y, from the image data Y, a process of removing the elements of the black image contained in the image data M, from the image data M, and a process of removing the elements of the black image contained in the image data C, from the image data C;

a print section, having an image carrier, which sequentially forms, on the image carrier, a plurality of color images corresponding to the image data Y, M, and C obtained through respective processes executed by the processing section, and transfers the color images formed on the image carrier to one sheet of paper;

a plurality of data holding sections which hold processing data required for the respective processes executed by the processing section; and a selecting section which sequentially selects, for each of the processes executed by the processing section, one of the processing data held in the respective data holding sections, concurrently with the formation of each color image carried out by the print section.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently embodiments of the invention, and together with the general description given above and the detailed description of the embodiments given below, serve to explain the invention.

DETAILED DESCRIPTION OF THE INVENTION

[1] A first embodiment of the present invention will be described.

Figure 1:
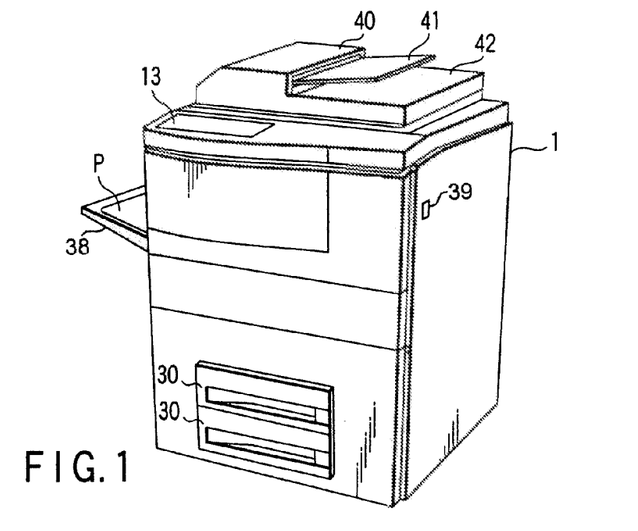
FIG. 1 is a view showing the entire configuration of each embodiment.
Figure 2:
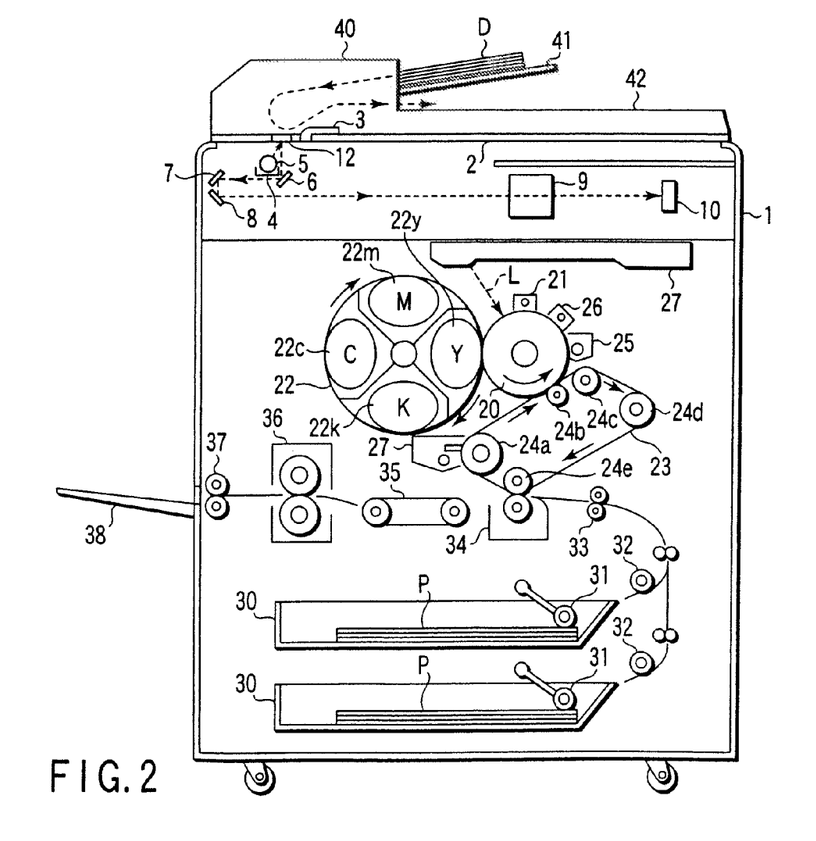
FIG. 2 is a view showing the internal configuration of each embodiment.

As shown in FIGS. 1 and 2, a transparent copy board (glass plate) 2 on which documents are placed is provided on the top surface portion of a main body 1. An indicator 3 is provided on one side portion of the copy board 2. A step portion between the indicator 3 and the copy board 2 is a reference position for a set document. These document sensors 11 optically sense the presence or absence and size of a document D set on the copy board 2.

A carriage 4 is provided under the bottom surface of the copy board 2 and is provided with an exposure lamp 5. The carriage 4 can move (reciprocate) along the bottom surface of the copy board 2. When the exposure lamp 5 is lit while the carriage 4 is reciprocating along the copy board 2, the document D placed on the copy board 2 is exposed. This exposure allows a reflected light image to be obtained from the document D. The reflected light image is projected onto a photoelectric converter, e.g. CCD 10 (Charge Coupled Device) by reflection mirrors 6, 7, and 8 and a variable-power lens block 9. The CCD 10 has a light-receiving surface on which a large number of light receiving elements (photoelectric converting elements) are arranged. The CCD scans each light receiving element to output an image signal (analog signal) with a voltage level corresponding to the density of the light image (an image of the document D) projected on the light receiving surface.

The image signal output by the CCD 10 is amplified and converted into a digital signal by a signal processing section 73, described later. The digital signal is processed by an image processing section 53, described later, and is then supplied to a laser unit 27. The laser unit 27 emits a laser beam L that is turned on and off according to an input signal.

A window 12 through which the document is read is provided adjacent to the indicator 3 of the copy board 2. The window 12 has a size and a shape corresponding to the longitudinal length of the indicator 3. Further, an automatic document feeder (ADF) 40 also acting as a copy board cover is provided on the copy board 2, the indicator 3, and the window 12 so as to be freely opened and closed. The automatic document feeder 40 has a tray 41 on which documents are placed, and feeds a plurality of documents D set on the tray 41, to the window 12 one by one so as to pass the documents over the window. The automatic document feeder 40 then discharges the documents D to a tray 42. When the automatic document feeder 40 operates, the exposure lamp 5 is lit at a position corresponding to the window 12. The window 12 is irradiated with this light. The document D passed over the window 12 is exposed through the window 12 to the light applied to the window 12. This exposure allows a reflected light image to be obtained from the document D. The reflected light image is projected onto the CCD 10 by the reflection mirrors 6, 7, and 8 and the variable-power lens block 9.

On the top surface portion of the main body 1, a control panel 13 as operation means for setting operational conditions is provided at a position that is not covered by the automatic document feeder 40. The control panel 13 is provided with a touch panel type liquid crystal display section, a condition setting key, a print key, and the like. The liquid display section allows information to be input by finger touch operations and enables the display of various items of information including the input information. Touching the liquid crystal display section with the finger enables the setting of image formation types and conditions and the specification of size of paper-sheet P, described later.

On the other hand, an image carrier, e.g. a photosensitive drum 20 is rotatably provided in a substantially central portion of the main body 1. A charger 21, a color developing machine 22, a transfer belt 23, a cleaner 25, and a static eliminator 26 are disposed around the photosensitive drum 20.

The charger 21 provides an electrostatic charge to a surface of the photosensitive drum 20 by applying a high-level bias voltage to the photosensitive drum 20. The surface of the completely charged photosensitive drum 20 is irradiated with a laser beam L emitted by a laser unit 27. The laser beam L main-scans (line scan) the surface of the photosensitive drum 20 in one direction. Furthermore, a sub-scanning operation is performed in which the main scanning is repeated as the photosensitive drum 20 rotates. Then, an electrostatic latent image corresponding to a read image from the document D is formed on the surface of the photosensitive drum 20.

The color developing unit 22 can rotate in the direction shown by the arrow in the figure, and has a yellow developing section 22$y$, a magenta developing section 22$m$, a cyan developing section 22$c$, and a black developing section 22$k$. The yellow developing section 22$y$ has yellow developer used to print a yellow image, and supplies the yellow developer to the surface of the photosensitive drum 20. The magenta developing section 22$m$ has magenta developer used to print a magenta image, and supplies the magenta developer to the surface of the photosensitive drum 20. The cyan developing section 22$m$ has cyan developer used to print a cyan image, and supplies the cyan developer to the surface of the photosensitive drum 20. The black developing section 22$k$ has black developer used to print a black image, and supplies the black developer to the surface of the photosensitive drum 20. The supply of developer by these developing sections allows the electrostatic latent images formed on the surface of the photosensitive drum 20 to be developed to form visible images.

To print the yellow image, the color developing unit 22 rotates to bring the yellow developing section 22$y$ into contact with the surface of the photosensitive drum 20. To print the magenta image, the color developing unit 22 rotates to bring the magenta developing section 22$m$ into contact with the surface of the photosensitive drum 20. To print the cyan image, the color developing unit 22 rotates to bring the cyan developing section 22$c$ into contact with the surface of the photosensitive drum 20. To print the black image, the color developing unit 22 rotates to bring the black developing section 22$k$ into contact with the surface of the photosensitive drum 20.

The transfer belt 23 is extended over a roller 24$a$, a transfer roller 24$b$, a drive roller 24$c$, a roller 24$d$, and a roller 24$e$, and rotates in the direction shown by the arrow in the figure as the photosensitive drum 20 rotates. The visible images of the respective colors on the surface of the photosensitive drum 20 are transferred to the transfer belt 23. The developer and charge remain on the photosensitive drum 20 to which the visible images have been transferred. The remaining developer is removed by the cleaner 25. The remaining charge is removed by the static eliminator 26.

A plurality of paper cassettes 30 are provided at the bottom of the main body 1. A large number of sheets of paper P having different sizes are accommodated in these paper cassettes 30. When the print key of the control panel 13 is turned on, the sheets of paper P are picked up from one of the paper cassettes 30 one by one. A pickup roller 31 is provided to pick up the paper-sheet P. Each picked up paper-sheet P is separated from the paper cassette 30 by a separator 32 and fed to a resist roller 33. The resist roller 33 feeds the paper-sheet P to between the transfer belt 23 and a transfer unit 34 using timing determined considering the rotation of the transfer belt 23.

The transfer unit 34 transfers the visible images of the respective colors that have been transferred to the belt 23, to the paper-sheet P. The paper-sheet P to which the visible images of the respective colors have been transferred is fed to a fixer 36 by the transfer belt 35. The fixer 36 thermally fixes the transfer images of the respective colors that have been transferred to the paper-sheet P. The paper-sheet P to which the images have been completely fixed is discharged by a discharge roller 37 to a tray 38 located outside the main body 1.

After the visible images of the respective images have been transferred to the transfer belt 23, developer remains on the transfer belt. The remaining developer is removed by the cleaner 27.

A power switch 39 is provided on a side of the main body 1.

Figure 3:
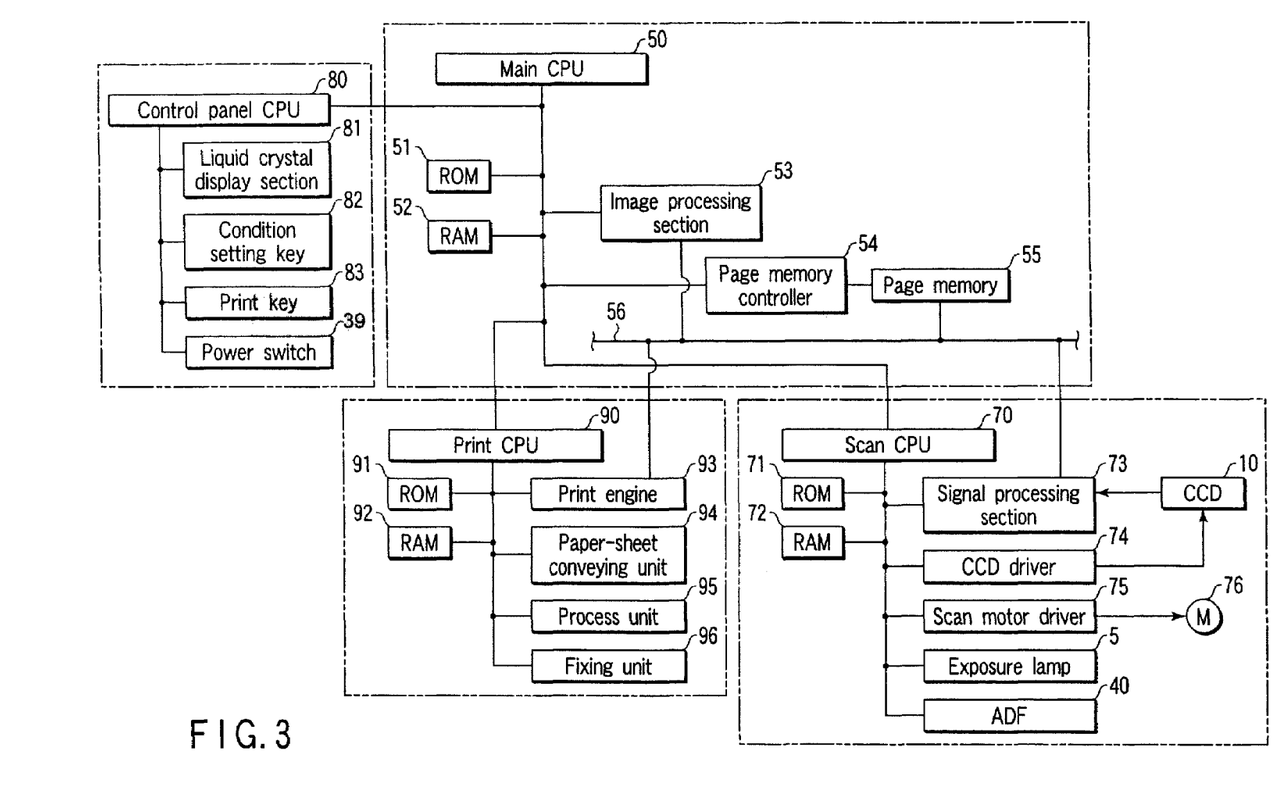
FIG. 3 is a block diagram of a control circuit in each embodiment.

A control circuit is shown in FIG. 3.

A scan CPU 70, a control panel CPU 80, and a print CPU 90 are connected to a main CPU 50. The main CPU 50 systematically controls the scan CPU 70, the control CPU 80, and the print CPU 90.

Further, the following components are connected to the main CPU 50: a ROM 51 that stores control programs, a RAM 52 that stores data, an image processing section 53, and a page memory controller 54. The page memory controller 54 controls writes and reads of image data to and from a page memory 55. The image processing section 53, the page memory controller 54, and the page memory 55 are interconnected via an image data bus 56.

The image processing section 53 executes processes such as color conversion and black generation on the image read from the document D and also executes γ correction, shading correction, various filtering processes, or a gradation process, all of which are well known, on the image.

The following components are connected to the scan CPU 70: a ROM 71 that stores control programs, a RAM 72 that stores data, a signal processing section 73 that converts the output from the CCD 10 into a digital signal, a CCD driver 74, a scan motor driver 75, the exposure lamp 5, the automatic paper feeder 40, and the like. The CCD driver 74 drives the CCD 10. The scan motor driver 75 drives a scan motor 76 that drives a carriage.

The scan CPU 70 and its peripheral arrangements mainly constitute a scan section that optically reads images from the document D.

The following components are connected to the control panel CPU 80: a liquid crystal display section 81, a condition setting key 82, a print key 83, and the power switch 39 on the control panel 13.

The following components are connected to the print CPU 90: a ROM 91 that stores control programs, a RAM 92 that stores data, a print engine 93, a paper-sheet conveying unit 94, a process unit 95, and a fixing unit 96. The print engine 93 is composed of the laser unit 27, its drive circuit, and the like. The paper-sheet conveying unit 94 is composed of a paper conveying mechanism that conveys paper from each of the paper feeding cassettes 30 to the tray 38, its drive circuit, and the like. The process unit 95 is composed of the photosensitive drum 20, the charger 21, the color developing unit 22, the transfer belt 23, the cleaner 25, the static eliminator 26, their drive circuits, and the like. The fixing unit 96 is composed of the fixer 34, its drive circuit, and the like.

The print CPU 90 and its peripheral arrangements mainly constitute the print section that prints an image read by the scan section on one paper-sheet P as a yellow image, a magenta image, a cyan image, and a black image.

Figure 4:
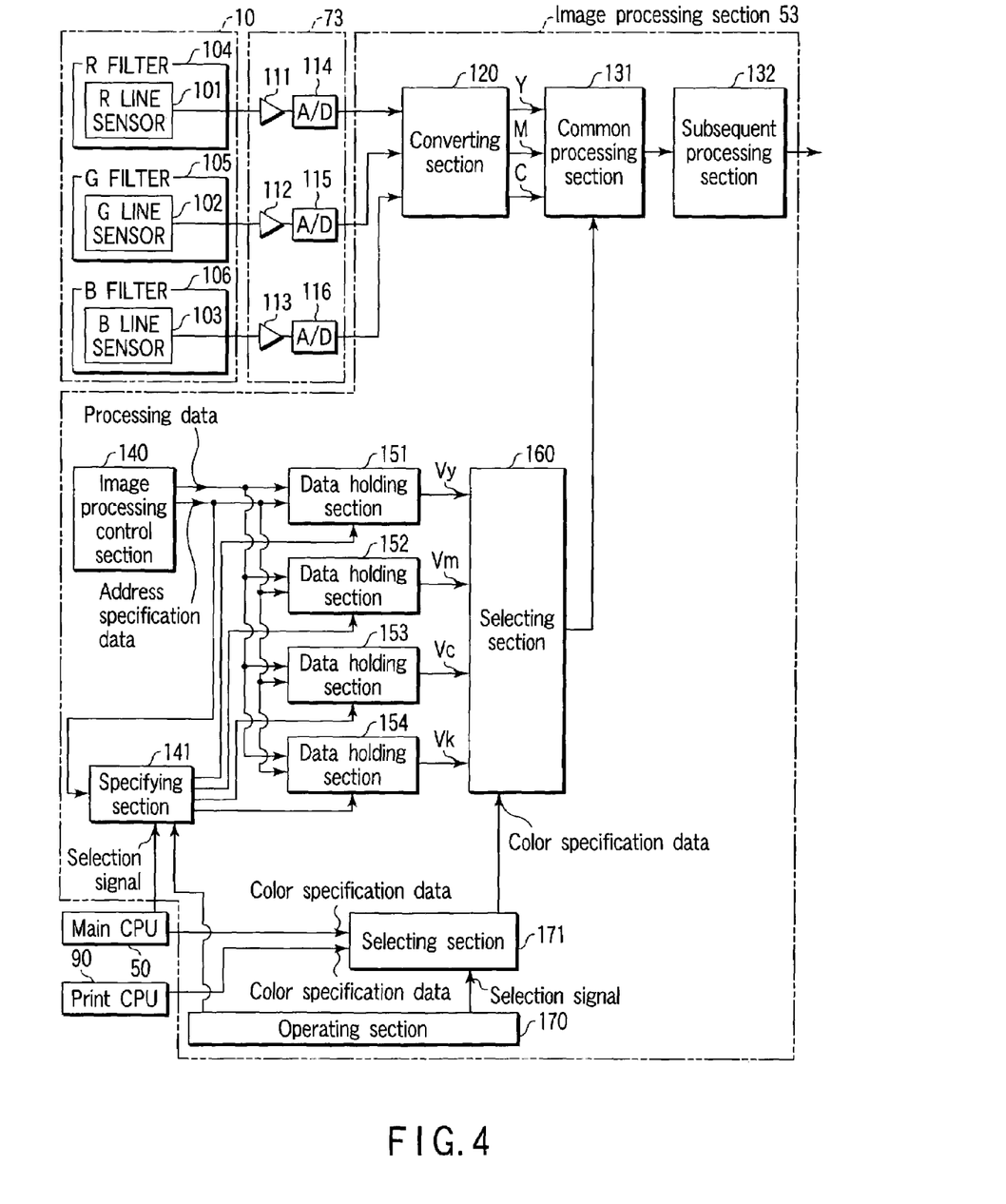
FIG. 4 is a block diagram specifically showing a configuration of essential parts of a first embodiment.

FIG. 4 shows a configuration of essential parts of the CCD 10, the signal processing section 73, and the image processing section 53.

The CCD 10 has a red line sensor 101 in which a large number of light receiving elements (photoelectric converting elements) are arranged linearly, a green line sensor 102 in which a large number of light receiving elements are arranged linearly, and a blue line sensor 103 in which a large number of light receiving elements are arranged linearly. A red filter 104 allowing red light to pass through is arranged in a light-receiving area of the line sensor 101. A green filter 105 allowing green light to pass through is arranged in a light-receiving area of the line sensor 102. A blue filter 106 allowing blue light to pass through is arranged in a light-receiving area of the line sensor 103.

Accordingly, an image signal corresponding to an image of red light is output by the line sensor 101. An image signal corresponding to an image of green light is output by the line sensor 102. An image signal corresponding to an image of blue light is output by the line sensor 103.

The signal processing circuit 73 has buffers 111, 112, and 113 and A/D (Analog-to-Digital) converters 114, 115, and 116.

An image signal corresponding to the image of red light is amplified by the buffer 111 and converted into a digital signal by the A/D converter 114 to form image data R. An image signal corresponding to the image of green light is amplified by the buffer 112 and converted into a digital signal by the A/D converter 115 to form image data G. An image signal corresponding to the image of blue light is amplified by the buffer 113 and converted into a digital signal by the A/D converter 116 to form image data B.

The colors of images handled by the printer section are yellow, magenta, cyan, and black. Thus, the image data R, G, and B are converted by a converting section 120 of the image processing section 53 into image data Y representing the yellow image, image data M representing the magenta image, and image data C representing the cyan image. These image data Y, M, and C are supplied to a common processing section 131 of the same image processing circuit 53.

The common processing section 131 executes a process of generating image data K representing a black image on the basis of the image data Y, M, and C and sequentially executes a process of removing elements of the black image contained in the image data Y, from the image data Y, a process of removing the elements of the black image contained in the image data M, from the image data M, and a process of removing the elements of the black image contained in the image data K, from the image data K.

The common processing section 131 also has a function of executing γ correction, shading correction, various filtering processes, or a gradation process, all of which are well-known, on the generated image data K and processed image data Y, M, and C.

The image data Y, M, C, and K processed by the common processing section 131 are supplied to a subsequent processing section 132. The subsequent processing section 132 outputs laser drive signals corresponding to the image data Y, M, C, and K, respectively, processed by the common processing section 131. These laser drive signals drive the laser unit 27, which then emits a laser beam L.

The image processing section 53 further has an image processing control section 140.

When the power switch 39 is turned on to activate the apparatus, the image processing control section 140 sequentially outputs yellow processing data Vy, magenta processing data Vm, cyan processing data Vc, and black processing data Vk required for the processes executed by the common processing section 131. The processing data output by the image processing control section 140 are supplied to data holding sections 151, 152, 153, and 154, respectively.

Further, in outputting the yellow processing data Vy, the image processing control section 140 outputs address specification data that allows the data holding section 151 to hold the yellow processing data Vy. In outputting the magenta processing data Vm, the image processing control section 140 outputs address specification data that allows the data holding section 152 to hold the magenta processing data Vm. In outputting the cyan processing data Vc, the image processing control section 140 outputs address specification data that allows the data holding section 153 to hold the cyan processing data Vc. In outputting the black processing data Vk, the image processing control section 140 outputs address specification data that allows the data holding section 154 to hold the black processing data Vk.

Each address specification data output by the image processing control section 140 is composed of a code of an upper several bits which is used to specify one of the data holding sections 151, 152, 153, and 154 and a code of a lower several bits which is used to indicate which holding area in the specified data holding section is to hold the processing data. This address specification data is supplied to a specifying section 141 and to the data holding section 151, 152, 153, or 154.

The specifying section 141 specifies one of the data holding sections 151, 152, 153, and 154 on the basis of the code of the higher several bits of the address specification data.

The data holding section 151 has a register and a memory which hold data. Upon receiving a specification from the specifying section 141, the data holding section 151 holds the yellow processing data Vy, one of the processing data supplied by the image processing control section 140, in a holding area corresponding to the code of the lower several bits of the address specification data supplied by the image processing control section 140.

The data holding section 152 has a register and a memory which hold data. Upon receiving a specification from the specifying section 141, the data holding section 152 holds the magenta processing data Vm, one of the processing data supplied by the image processing control section 140, in a holding area corresponding to the code of the lower several bits of the address specification data supplied by the image processing control section 140.

The data holding section 153 has a register and a memory which hold data. Upon receiving a specification from the specifying section 141, the data holding section 153 holds the cyan processing data Vc, one of the processing data supplied by the image processing control section 140, in a holding area corresponding to the code of the lower several bits of the address specification data supplied by the image processing control section 140.

The data holding section 154 has a register and a memory which hold data. Upon receiving a specification from the specifying section 141, the data holding section 154 holds the black processing data Vk, one of the processing data supplied by the image processing control section 140, in a holding area corresponding to the code of the lower several bits of the address specification data supplied by the image processing control section 140.

In addition to the function of specifying one of the data holding sections 151, 152, 153, and 154 according to the one address specification data supplied by the image processing control section 140, the specifying section 141 has a function of specifying any plural ones of the data holding sections 151, 152, 153, and 154 according to the one address specification data supplied by the image processing control section 140. A selection signal from the main CPU 50 selects one of the data holding sections which is to be specified by the specifying section 141. An operation section 170 may also be operated to select one of the data holding sections which is to be specified by the specifying section 141.

For example, if the yellow processing data Vy and the magenta processing data Vm have the same contents, when the yellow processing data Vy is output by the image processing section 140, both data holding sections 151 and 152 are specified on the basis of the address specification data output by the image processing control section 140. In this case, simultaneously with holding of the yellow processing data Vy in the data holding section 151, the same yellow processing data Vy is held in the data holding section 152 as the magenta processing data Vm. The image processing control section 140 has only to output the yellow processing data Vy, the cyan processing data Vc, and the black processing data Vk and need not output the magenta processing data Vm.

If the yellow processing data Vy and the cyan processing data Vc have the same contents, when the yellow processing data Vy is output by the image processing section 140, both data holding sections 151 and 153 are specified on the basis of the address specification data output by the image processing control section 140. In this case, simultaneously with holding of the yellow processing data Vy in the data holding section 151, the same yellow processing data Vy is held in the data holding section 153 as the cyan processing data Vc. The image processing control section 140 has only to output the yellow processing data Vy, the magenta processing data Vm, and the black processing data Vk and need not output the cyan processing data Vc.

If the yellow processing data Vy, the magenta processing data Vm, and the cyan processing data Vc have the same contents, when the yellow processing data Vy is output by the image processing section 140, all of the data holding sections 151, 152, and 153 are specified on the basis of the address specification data output by the image processing control section 140. In this case, simultaneously with holding of the yellow processing data Vy in the data holding section 151, the same yellow processing data Vy is held in the data holding section 152 as the magenta processing data Vm. Further, the same yellow processing data Vy is held in the data holding section 153 as the cyan processing data Vc. The image processing control section 140 has only to output the yellow processing data Vy and the black processing data Vk and need not output the magenta processing data Vm and the cyan processing data Vc.

By thus simultaneously holding processing data having the same contents in a plurality of data holding sections, the time can be reduced which is required to write data to the data holding sections 151, 152, 153, and 154.

The print CPU 90 outputs yellow-specifying color specification data concurrently with the formation of a yellow image, outputs cyan-specifying color specification data concurrently with the formation of a cyan image, and outputs black-specifying color specification data concurrently with the formation of a black image.

The main CPU 50 may output test color specification data.

A selecting section 171 is supplied with color specification data output by the print CPU 90 and color specification data output by the main CPU 50. If a test mode is not set by the operation section 170, the selecting section 171 selects and outputs the color specification data from the print CPU 90. When the test mode is set by the operation section 170, the selecting section 171 selects and outputs the color specification data from the main CPU 50.

The selecting section 160 is supplied with the color specification data output by the selecting section 171.

The selecting section 160 sequentially selects, for each process executed by the common processing section 131, one of the processing data held in the data holding sections 151, 152, 153, and 154 concurrently with the formation of each color image carried out by the print section.

That is, upon receiving the yellow-specifying color specification data, the selecting section 160 selects and outputs the yellow specifying data Vy from the data holding section 151. Upon receiving the magenta-specifying color specification data, the selecting section 160 selects and outputs the magenta specifying data Vm from the data holding section 152. Upon receiving the cyan-specifying color specification data, the selecting section 160 selects and outputs the cyan specifying data Vc from the data holding section 153. Upon receiving the black-specifying color specification data, the selecting section 160 selects and outputs the black specifying data Vk from the data holding section 154.

The common processing section 131 is supplied with the processing data Vy, Vm, Vc, and Vk output by the selecting section 171.

Figure 5:
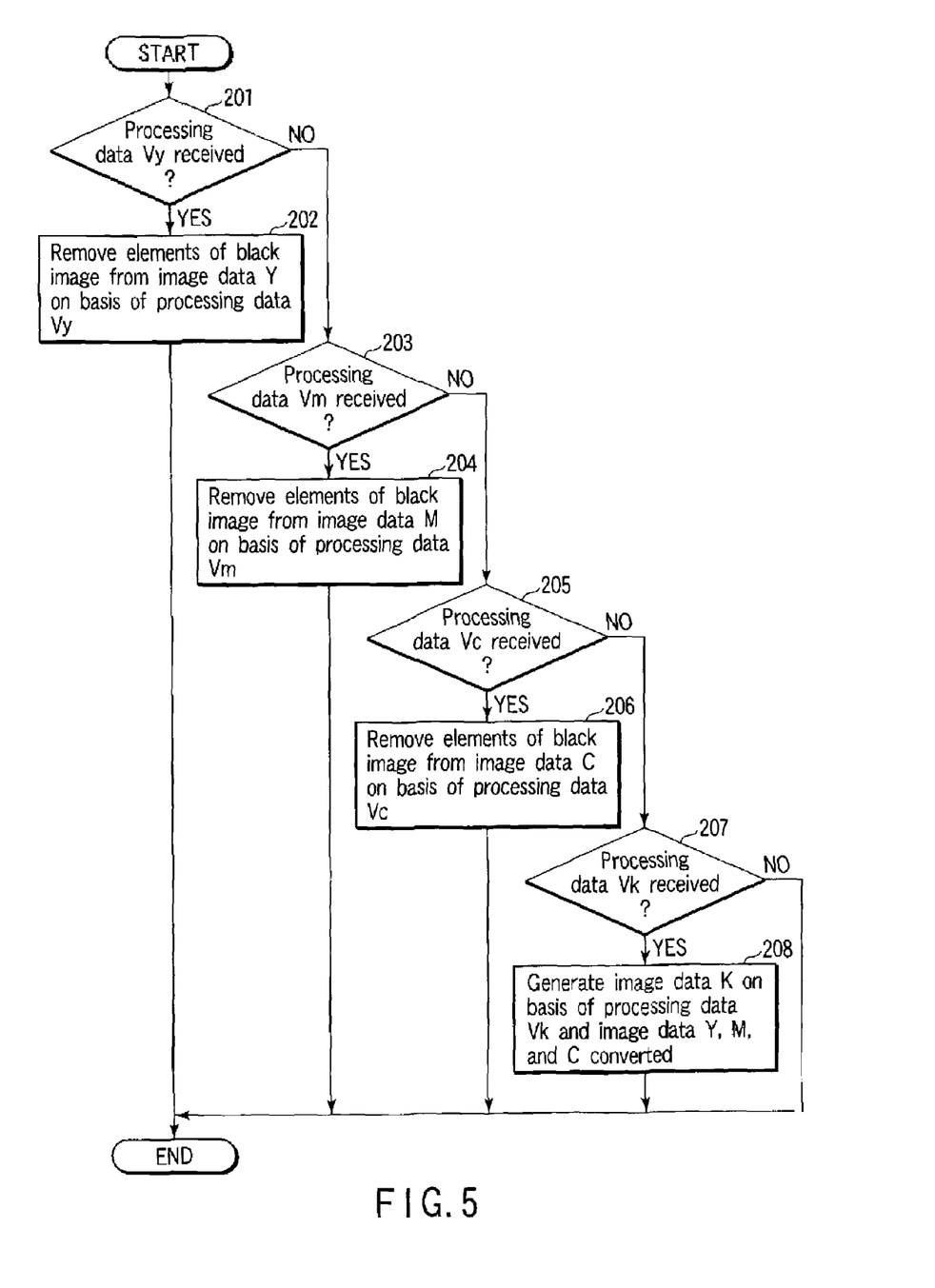
FIG. 5 is a flowchart useful in describing operations of a common processing section according to the first embodiment.

Now, operations will be described. The flowchart in FIG. 5 shows control effected by the common processing section 131.

When the power switch 38 is turned on to activate the apparatus, the yellow processing data Vy is held in the data holding section 151. The magenta processing data Vm is held in the data holding section 152. The cyan processing data Vc is held in the data holding section 153. The black processing data Vk is held in the data holding section 154.

When the document D is set on the copy board 2 and the print key 83 is turned on, an image on the document D is optically read. That is, the CCD 10 outputs an image signal corresponding to an image of red light, an image signal corresponding to an image of green light, and an image signal corresponding to an image of blue light. These image signals are converted into image data R, G, and B by the signal processing section 73. These image data R, G, and B are converted into image data Y, M, and C by the converting section 120.

On the other hand, the print CPU 90 outputs yellow-specifying color specification data, which is then supplied to the selecting section 160 via the selecting section 171. The selecting section 160 selects and outputs the yellow processing data Vy from the data holding section 151 according to the yellow-specifying color specification data. The output yellow processing data Vy is supplied to the common processing section 131.

Upon receiving the yellow processing data Vy (step 201, YES), the common processing section 131 removes the elements of a black image from the image data Y on the basis of the yellow specifying data Vy (step 202).

The image data Y free from the elements of the black image is subjected to γ correction, shading correction, various filtering processes, or a gradation process as required and is then supplied to the subsequent processing section 132. The subsequent processing section 132 outputs a laser drive signal according to the image data Y supplied by the common processing section 131. This laser drive signal drives the laser unit 27, which then emits a laser beam L. The laser beam L forms an electrostatic latent image corresponding to a yellow image, on the surface of the photosensitive drum 20. Concurrently with the formation of this electrostatic latent image, the color developing unit 22 rotates to bring the yellow developing section 22y of the color developing unit 22 into contact with the surface of the photosensitive drum 20. In this state, the yellow developing section 22y supplies the yellow developer to the surface of the photosensitive drum 20. The supply of the yellow developer allows the electrostatic latent image on the surface of the photosensitive drum 20 to be developed to form a yellow visible image. This yellow visible image is transferred to the transfer belt 23.

Once the yellow image has been completely developed and transferred, the print CPU 90 outputs magenta-specifying color specification data, which is then supplied to the selecting section 160 via the selecting section 171. The selecting section 160 selects and outputs the magenta processing data Vm from the data holding section 152 according to the magenta-specifying color specification data. The output magenta processing data Vm is supplied to the common processing section 131.

Upon receiving the magenta processing data Vm (step 203, YES), the common processing section 131 removes the elements of the black image from the image data M on the basis of the magenta specifying data Vm (step 204).

The image data M free from the elements of the black image is subjected to γ correction, shading correction, various filtering processes, or a gradation process as required and is then supplied to the subsequent processing section 132. The subsequent processing section 132 outputs a laser drive signal according to the image data M supplied by the common processing section 131. This laser drive signal drives the laser unit 27, which then emits a laser beam L. The laser beam L forms an electrostatic latent image corresponding to a magenta image, on the surface of the photosensitive drum 20. Concurrently with the formation of this electrostatic latent image, the color developing unit 22 rotates to bring the magenta developing section 22m of the color developing unit 22 into contact with the surface of the photosensitive drum 20. In this state, the magenta developing section 22m supplies the yellow developer to the surface of the photosensitive drum 20. The supply of the magenta developer allows the electrostatic latent image on the surface of the photosensitive drum 20 to be developed to form a magenta visible image. This magenta visible image is transferred to the transfer belt 23.

Once the magenta image has been completely developed and transferred, the print CPU 90 outputs cyan-specifying color specification data, which is then supplied to the selecting section 160 via the selecting section 171. The selecting section 160 selects and outputs the cyan processing data Vc from the data holding section 153 according to the cyan-specifying color specification data. The output cyan processing data Vc is supplied to the common processing section 131.

Upon receiving the cyan processing data Vc (step 205, YES), the common processing section 131 removes the elements of the black image from the image data C on the basis of the cyan specifying data Vc (step 206).

The image data C free from the elements of the black image is subjected to γ correction, shading correction, various filtering processes, or a gradation process as required and is then supplied to the subsequent processing section 132. The subsequent processing section 132 outputs a laser drive signal according to the image data C supplied by the common processing section 131. This laser drive signal drives the laser unit 27, which then emits a laser beam L. The laser beam L forms an electrostatic latent image corresponding to a cyan image, on the surface of the photosensitive drum 20. Concurrently with the formation of this electrostatic latent image, the color developing unit 22 rotates to bring the cyan developing section 22c of the color developing unit 22 into contact with the surface of the photosensitive drum 20. In this state, the cyan developing section 22c supplies the cyan developer to the surface of the photosensitive drum 20. The supply of the cyan developer allows the electrostatic latent image on the surface of the photosensitive drum 20 to be developed to form a cyan visible image. This cyan visible image is transferred to the transfer belt 23.

Once the cyan image has been completely developed and transferred, the print CPU 90 outputs black-specifying color specification data, which is then supplied to the selecting section 160 via the selecting section 171. The selecting section 160 selects and outputs the black processing data Vk from the data holding section 153 according to the black-specifying color specification data. The output black processing data Vk is supplied to the common processing section 131.

Upon receiving the black processing data Vk (step 207, YES), the common processing section 131 generates image data K on the basis of the black processing data Vk and the image data Y, M, and C converted by the converting section 120 (step 208).

The generated image data K is subjected to γ correction, shading correction, various filtering processes, or a gradation process as required and is then supplied to the subsequent processing section 132. The subsequent processing section 132 outputs a laser drive signal according to the image data K from the common processing section 131. This laser drive signal drives the laser unit 27, which then emits a laser beam L. The laser beam L forms an electrostatic latent image corresponding to a black image, on the surface of the photosensitive drum 20. Concurrently with the formation of this electrostatic latent image, the color developing unit 22 rotates to bring the black developing section 22k of the color developing unit 22 into contact with the surface of the photosensitive drum 20. In this state, the black developing section 22k supplies the black developer to the surface of the photosensitive drum 20. The supply of the black developer allows the electrostatic latent image on the surface of the photosensitive drum 20 to be developed to form a black visible image. This black visible image is transferred to the transfer belt 23.

The yellow, magenta, cyan, and black visible images that have been transferred to the transfer belt 23 are transferred all together to one paper-sheet P supplied by the paper cassette 30. The transferred visible images are fixed to the paper-sheet P by heat generated by the fixer 36. The paper-sheet P that has passed through the fixer 36 is discharged by the discharge roller 37 to the tray 38, located outside the main body 1.

As described above, the one common processing section 131 sequentially executes the process of removing the elements of the black image from the image data Y, the process of removing the elements of the black image from the image data M, and the process of removing the elements of the black image from the image data C. This simplifies the configuration of the apparatus and reduces its size and cost.

[2] A second embodiment will be described.

Figure 6:
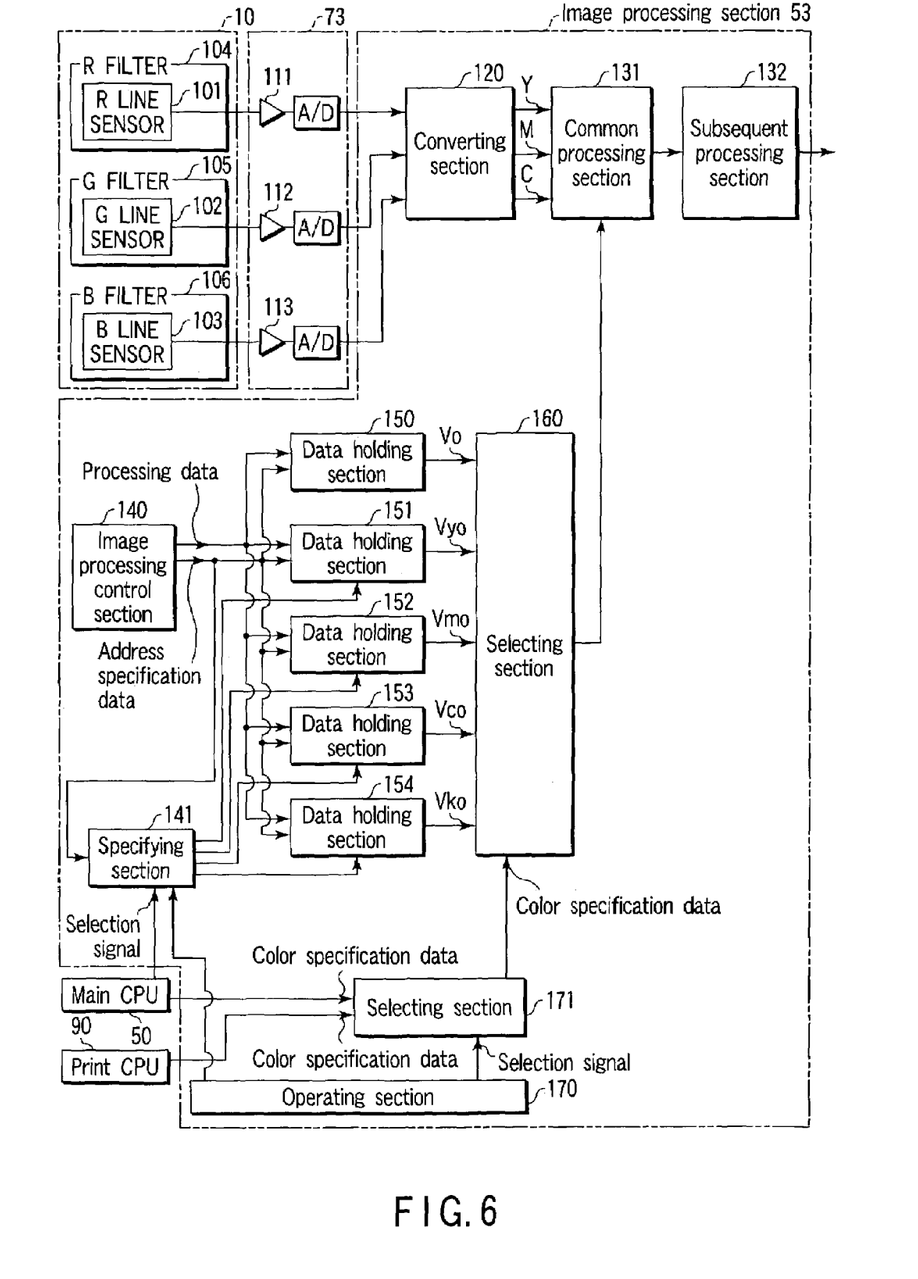
FIG. 6 is a block diagram specifically showing a configuration of an essential part of a second embodiment.

As shown in FIG. 6, a data holding section 150 is provided.

When the power switch 39 is turned on to activate the apparatus, the image processing control section 140 sequentially outputs common processing data Vo, yellow processing data Vyo, magenta processing data Vmo, cyan processing data Vco, and black processing data Vko.

The common processing data Vo is contained in all of the yellow processing data Vy, magenta processing data Vm, cyan processing data Vc, and black processing data Vk according to the first embodiment, and is the same in all these data.

The yellow processing data Vyo is the remainder when the common processing data Vo is subtracted from the yellow processing data Vy according to the first embodiment. The magenta processing data Vmo is the remainder when the common processing data Vo is subtracted from the magenta processing data Vm according to the first embodiment. The cyan processing data Vco is the remainder when the common processing data Vo is subtracted from the cyan processing data Vc according to the first embodiment. The black processing data Vko is the remainder when the common processing data Vo is subtracted from the magenta processing data Vk according to the first embodiment.

The data holding sections 150, 151, 152, 153 and 154 are all supplied with the common processing data Vo, the yellow processing data Vyo, the magenta processing data Vmo, the cyan processing data Vco, and the black processing data Vko.

Further, in outputting the common processing data Vo, the image processing control section 140 outputs address specification data used to allow the data holding section 150 to hold the common processing data Vo. In outputting the yellow processing data Vyo, the image processing control section 140 outputs address specification data used to allow the data holding section 151 to hold the yellow processing data Vyo. In outputting the magenta processing data Vmo, the image processing control section 140 outputs address specification data used to allow the data holding section 152 to hold the magenta processing data Vmo. In outputting the cyan processing data Vco, the image processing control section 140 outputs address specification data used to allow the data holding section 153 to hold the cyan processing data Vco. In outputting the black processing data Vko, the image processing control section 140 outputs address specification data used to allow the data holding section 154 to hold the black processing data Vko.

Each address specification data output by the image processing control section 140 is composed of a code of an upper several bits which is used to specify one of the data holding sections 150, 151, 152, 153, and 154 and a code of a lower several bits which is used to indicate which holding area in the specified data holding section is to hold the processing data. This address specification data is supplied to the specifying section 141 and to the data holding section 150, 151, 152, 153, or 154.

The specifying section 141 specifies one of the data holding sections 150, 151, 152, 153, and 154 on the basis of the code of the higher several bits of the address specification data.

The data holding section 150 has a register and a memory which hold data. Upon receiving a specification from the specifying section 141, the data holding section 150 holds the common processing data Vo, one of the processing data supplied by the image processing control section 140, in a holding area corresponding to the code of the lower several bits of the address specification data supplied by the image processing control section 140.

The data holding section 151 has a register and a memory which hold data. Upon receiving a specification from the specifying section 141, the data holding section 151 holds the yellow processing data Vyo, one of the processing data supplied by the image processing control section 140, in a holding area corresponding to the code of the lower several bits of the address specification data supplied by the image processing control section 140.

The data holding section 152 has a register and a memory which hold data. Upon receiving a specification from the specifying section 141, the data holding section 152 holds the magenta processing data Vmo, one of the processing data supplied by the image processing control section 140, in a holding area corresponding to the code of the lower several bits of the address specification data supplied by the image processing control section 140.

The data holding section 153 has a register and a memory which hold data. Upon receiving a specification from the specifying section 141, the data holding section 153 holds the cyan processing data Vco, one of the processing data supplied by the image processing control section 140, in a holding area corresponding to the code of the lower several bits of the address specification data supplied by the image processing control section 140.

The data holding section 154 has a register and a memory which hold data. Upon receiving a specification from the specifying section 141, the data holding section 154 holds the black processing data Vko, one of the processing data supplied by the image processing control section 140, in a holding area corresponding to the code of the lower several bits of the address specification data supplied by the image processing control section 140.

In addition to the function of specifying one of the data holding sections 150, 151, 152, 153, and 154 according to the one address specification data supplied by the image processing control section 140, the specifying section 141 has a function of specifying any plural ones of the data holding sections 150, 151, 152, 153, and 154 according to the one address specification data supplied by the image processing control section 140. A selection signal from the main CPU 50 selects one of the data holding sections which is to be specified by the specifying section 141. The operating section 170 may also be operated to select one of the data holding sections which is to be specified by the specifying section 141.

For example, if the yellow processing data Vyo and the magenta processing data Vmo have the same contents, when the yellow processing data Vyo is output by the image processing section 140, both data holding sections 151 and 152 are specified on the basis of the address specification data output by the image processing control section 140. In this case, simultaneously with holding of the yellow processing data Vyo in the data holding section 151, the same yellow processing data Vyo is held in the data holding section 152 as the magenta processing data Vmo. The image processing control section 140 has only to output the yellow processing data Vyo, the cyan processing data Vco, and the black processing data Vko and need not output the magenta processing data Vmo.

If the yellow processing data Vyo and the cyan processing data Vco have the same contents, when the yellow processing data Vyo is output by the image processing section 140, both data holding sections 151 and 153 are specified on the basis of the address specification data output by the image processing control section 140. In this case, simultaneously with holding of the yellow processing data Vyo in the data holding section 151, the same yellow processing data Vyo is held in the data holding section 153 as the cyan processing data Vco. The image processing control section 140 has only to output the yellow processing data Vyo, the magenta processing data Vmo, and the black processing data Vko and need not output the cyan processing data Vco.

If the yellow processing data Vyo, the magenta processing data Vmo, and the cyan processing data Vco have the same contents, when the yellow processing data Vyo is output by the image processing section 140, all of the data holding sections 151, 152, and 153 are specified on the basis of the address specification data output by the image processing control section 140. In this case, simultaneously with holding of the yellow processing data Vyo in the data holding section 151, the same yellow processing data Vyo is held in the data holding section 152 as the magenta processing data Vmo. Further, the same yellow processing data Vyo is held in the data holding section 153 as the cyan processing data Vco. The image processing control section 140 has only to output the yellow processing data Vyo and the black processing data Vko and need not output the magenta processing data Vmo and the cyan processing data Vco.

By thus simultaneously holding processing data having the same contents in a plurality of data holding sections, the time can be reduced which is required to write data to the data holding sections 150, 151, 152, 153, and 154.

Upon receiving the yellow-specifying color specification data, the selecting section 160 sequentially selects and outputs the yellow specifying data Vyo from the data holding section 151 and the common processing data Vo from the data holding section 150. Upon receiving the magenta-specifying color specification data, the selecting section 160 sequentially selects and outputs the magenta specifying data Vmo from the data holding section 152 and the common processing data Vo from the data holding section 150. Upon receiving the cyan-specifying color specification data, the selecting section 160 sequentially selects and outputs the cyan specifying data Vco from the data holding section 153 and the common processing data Vo from the data holding section 150. Upon receiving the black-specifying color specification data, the selecting section 160 sequentially selects and outputs the black specifying data Vko from the data holding section 154 and the common processing data Vo from the data holding section 150.

The common processing section 131 is supplied with the processing data Vo, Vyo, Vmo, Vco, and Vko output by the selecting section 171.

The other parts of the configuration are the same as those of the first embodiment.

Figure 7:
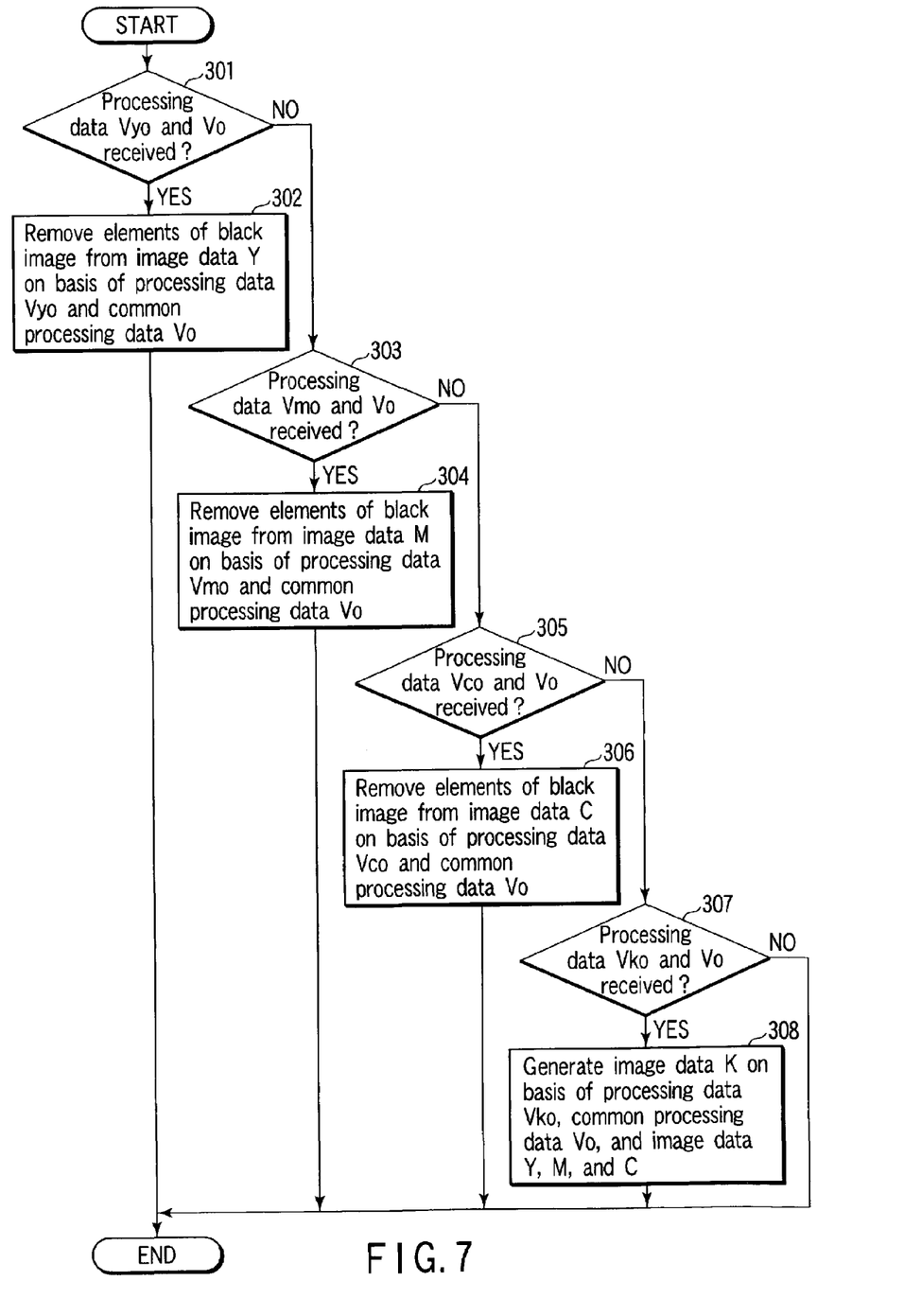
FIG. 7 is a flowchart useful in describing operations of a common processing section according to the second embodiment.

Operations will be described. The flowchart in FIG. 7 shows control effected by the common processing section 131.

When the power switch 38 is turned on to activate the apparatus, the common processing data Vo is held in the data holding section 150. The yellow processing data Vyo is held in the data holding section 151. The magenta processing data Vmo is held in the data holding section 152. The cyan processing data Vco is held in the data holding section 153. The black processing data Vko is held in the data holding section 154.

When the document D is set on the copy board 2 and the print key 83 is turned on, an image on the document D is optically read. The CCD 10 outputs an image signal corresponding to an image of red light, an image signal corresponding to an image of green light, and an image signal corresponding to an image of blue light. These image signals are converted into image data R, G, and B, which are further converted into image data Y, M, and C.

On the other hand, the print CPU 90 outputs yellow-specifying color specification data, which is then supplied to the selecting section 160 via the selecting section 171. The selecting section 160 sequentially selects and outputs the yellow processing data Vyo from the data holding section 151 and the common processing data Vo from the data holding section 150 according to the yellow-specifying color specification data. The output yellow processing data Vyo and common processing data Vo are supplied to the common processing section 131.

Upon receiving the yellow processing data Vyo (step 301, YES), the common processing section 131 removes the elements of a black image from the image data Y on the basis of the yellow specifying data Vyo and the common processing data Vo (step 302). A yellow image based on the image data Y free from the elements of the black image is transferred to the transfer belt 23.

Once the yellow image has been completely transferred, the print CPU 90 outputs magenta-specifying color specification data, which is then supplied to the selecting section 160 via the selecting section 171. The selecting section 160 sequentially selects and outputs the magenta processing data Vmo from the data holding section 152 and the common processing data Vo from the data holding section 150 according to the magenta-specifying color specification data. The output magenta processing data Vmo and common processing data Vo are supplied to the common processing section 131.

Upon receiving the magenta processing data Vmo and the common processing data Vo (step 303, YES), the common processing section 131 removes the elements of the black image from the image data M on the basis of the magenta specifying data Vmo and the common processing data Vo (step 304). A magenta image based on the image data M free from the elements of the black image is transferred to the transfer belt 23.

Once the magenta image has been completely transferred, the print CPU 90 outputs cyan-specifying color specification data, which is then supplied to the selecting section 160 via the selecting section 171. The selecting section 160 sequentially selects and outputs the cyan processing data Vco from the data holding section 153 and the common processing data Vo from the data holding section 150 according to the cyan-specifying color specification data. The output cyan processing data Vco and common processing data Vo are supplied to the common processing section 131.

Upon receiving the cyan processing data Vco and the common processing data Vo (step 305, YES), the common processing section 131 removes the elements of the black image from the image data C on the basis of the cyan specifying data Vco and the common processing data Vo (step 306). A cyan image based on the image data C free from the elements of the black image is transferred to the transfer belt 23.

Once the cyan image has been completely transferred, the print CPU 90 outputs black-specifying color specification data, which is then supplied to the selecting section 160 via the selecting section 171. The selecting section 160 sequentially selects and outputs the cyan processing data Vko from the data holding section 153 and the common processing data Vo from the data holding section 150 according to the black-specifying color specification data. The output black processing data Vko and common processing data Vo are supplied to the common processing section 131.

Upon receiving the black processing data Vko and the common processing data Vo (step 307, YES), the common processing section 131 generates image data K on the basis of the black specifying data Vko and the common processing data Vo and on the image data Y, M, and C converted by the converting section 120 (step 308). A black image based on the generated image data K is transferred to the transfer belt 23.

Thus, yellow, magenta, cyan, and black visible images transferred to the transfer belt 23 are transferred all together to one sheet of paper P supplied by the paper cassette 30.

As described above, the one common processing section 131 sequentially executes the process of removing the elements of the black image from the image data Y, the process of removing the elements of the black image from the image data M, and the process of removing the elements of the black image from the image data C. This simplifies the configuration of the apparatus and reduces its size and cost.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image forming apparatus comprising:
a photoelectric converter which outputs an image signal corresponding to an image of red light, an image signal corresponding to an image of green light, and an image signal corresponding to an image of blue light;
a converting section which converts the image signals output by the photoelectric converter into image data Y representing a yellow image, image data M representing a magenta image, and image data C representing a cyan image, respectively;
one processing section which executes a process of generating image data K representing a black image on the basis of the image data Y, M, and C and which sequentially executes a process of removing elements of the black image contained in the image data Y, from the image data Y, a process of removing the elements of the black image contained in the image data M, from the image data M, and a process of removing the elements of the black image contained in the image data C, from the image data C;
a print section which has an image carrier, sequentially forms, on the image carrier, a plurality of color images corresponding to the image data Y, M, C and K obtained through respective processes executed by the processing section, and transfers the color images formed on the image carrier to one sheet of paper;
one data holding section which holds first processing data contained in each of a plurality of processing data required for respective processes executed by the processing section;
a plurality of data holding sections which hold a plurality of second processing data, respectively, the second processing data being a remainder when the first processing data is subtracted from each of the plurality of processing data required for the respective processes executed by the processing section; and
a selecting section which sequentially selects, for each of the processes executed by the processing section, one of the first processing data held in the first data holding section and the second processing data held in the second data holding sections, concurrently with formation of each color image carried out by the print section.

2. An apparatus according to claim 1, wherein the first processing data is processing data Vo contained in each of yellow processing data Vy, magenta processing data Vm, cyan processing data Vc, and black processing data Vk which are required for the respective processes executed by the processing section, and wherein the second processing data are yellow processing data Vyo, magenta processing data Vmo, cyan processing data Vco, and black processing data Vko which are remainders when the processing data Vo is subtracted from the yellow processing data Vy, the magenta processing data Vm, the cyan processing data Vc, and the black processing data Vk, respectively.

3. An apparatus according to claim 1, further comprising a control section which causes the first processing data to be held in the first data holding section and causes the second processing data to be held in the respective second data holding sections when the apparatus is activated.

4. An apparatus according to claim 1, wherein the print section has a laser unit which carries out scanning with a laser beam to sequentially form, on the image carrier, electrostatic latent images corresponding to the image data Y, M, and C processed by the processing section and the image data K processed by the processing section, respectively, a color developing unit which develops the electrostatic latent images formed on the image carrier using developing materials of different colors, and a transfer belt to which color images developed by the color developing unit are transferred, and the print section transfers the color images that have been transferred to the transfer belt, to the one sheet of paper.

5. A method of controlling an image forming apparatus comprising a photoelectric converter which outputs an image signal corresponding to an image of red light, an image signal corresponding to an image of green light, and an image signal corresponding to an image of blue light, the method comprising:

converting the image signals output by the photoelectric converter into image data Y representing a yellow image, image data M representing a magenta image, and image data C representing a cyan image, respectively;

using one processing section to execute a process of generating image data K representing a black image on the basis of the image data Y, M, and C and to sequentially execute a process of removing elements of the black image contained in the image data Y, from the image data Y, a process of removing the elements of the black image contained in the image data M, from the image data M, and a process of removing the elements of the black image contained in the image data C, from the image data C;

sequentially forming, on the image carrier, a plurality of color images corresponding to the image data Y, M, C and K obtained through respective processes executed by the processing section;

transferring the color images formed on the image carrier to one sheet of paper;

holding first processing data in a first data holding section, the first processing data being contained in each of a plurality of processing data required for respective processes executed by the processing section;

holding a plurality of second processing data, respectively, in a plurality of second holding sections, the second processing data being a remainder when the first processing data is subtracted from each of the plurality of processing data required for the respective processes executed by the processing section; and sequentially selecting, for each of the processes executed by the processing section, one of the first processing data held in the first data holding section and the second processing data held in the second data holding sections, concurrently with formation of each color image carried out by the print section.

6. An image forming apparatus comprising:

photoelectric converting means for outputting an image signal corresponding to an image of red light, an image signal corresponding to an image of green light, and an image signal corresponding to an image of blue light;

convening means for converting the image signals output by the photoelectric converter into image data Y representing a yellow image, image data M representing a magenta image, and image data C representing a cyan image, respectively;

one processing means for executing a process of generating image data K representing a black image on the basis of the image data Y, M, and C and sequentially executing a process of removing elements of the black image contained in the image data Y, from the image data Y, a process of removing the elements of the black image contained in the image data M, from the image data M, and a process of removing the elements of the black image contained in the image data C, from the image data C;

print means having an image carrier, for sequentially forming, on the image carrier, a plurality of color images corresponding to the image data Y, M, C and K obtained through respective processes executed by the processing means, and transferring the color images formed on the image carrier to one sheet of paper;

one data holding means for holding first processing data contained in each of a plurality of processing data required for respective processes executed by the processing means;

a plurality of data holding means for holding a plurality of second processing data, respectively, the second processing data being a remainder when the first processing data is subtracted from each of the plurality of processing data required for the respective processes executed by the processing means; and selecting means for sequentially selecting, for each of the processes executed by the processing means, one of the first processing data held in the first data holding means and the second processing data held in the second data holding means, concurrently with formation of each color image carried out by the print means.

7. An apparatus according to claim 6, wherein the first processing data is processing data Vo contained in each of yellow processing data Vy, magenta processing data Vm, cyan processing data Vc, and black processing data Vk which are required for the respective processes executed by the processing means, and wherein the second processing data are yellow processing data Vyo, magenta processing data Vmo, cyan processing data Vco, and black processing data Vko which are remainders when the processing data Vo is subtracted from the yellow processing data Vy, the magenta processing data Vm, the cyan processing data Vc, and the black processing data Vk, respectively.

8. An apparatus according to claim 6, further comprising control means for causing the first processing data to be held in the first data holding means and causing the second processing data to be held in the respective second data holding means when the apparatus is activated.

9. An apparatus according to claim 6, wherein the print means has a laser unit which carries out scanning with a laser beam to sequentially form, on the image carrier, electrostatic latent images corresponding to the image data Y, M, and C processed by the processing means and the image data K processed by the processing means, respectively, a color developing unit which develops the electrostatic latent images formed on the image carrier using developing materials of different colors, and a transfer belt to which color images developed by the color developing unit are transferred, and the print means transfers the color images that have been transferred to the transfer belt, to the one sheet of paper.

* * * * *